March 12, 1940.  P. LAZARIDES  2,193,426
PIPE CLAMP
Filed July 12, 1938
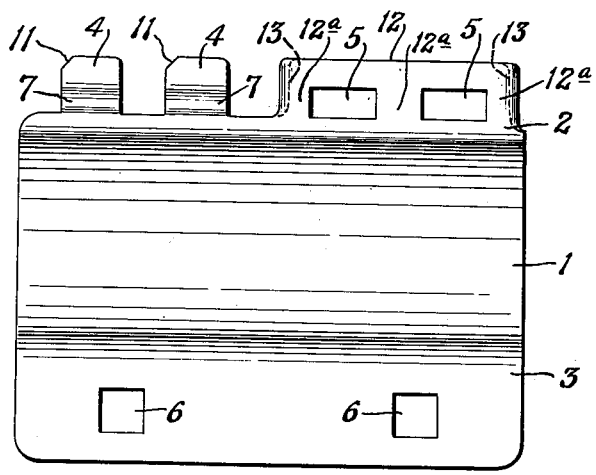
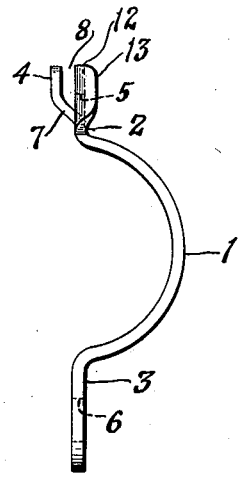
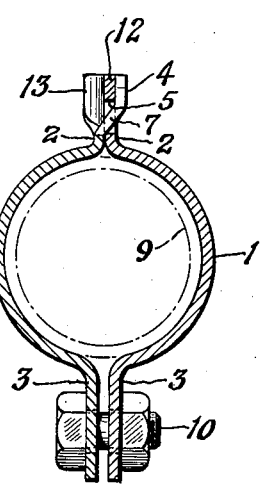
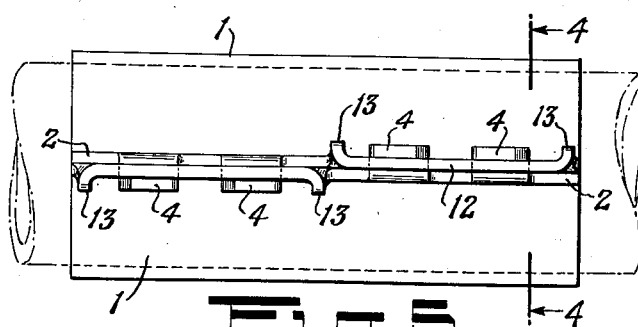
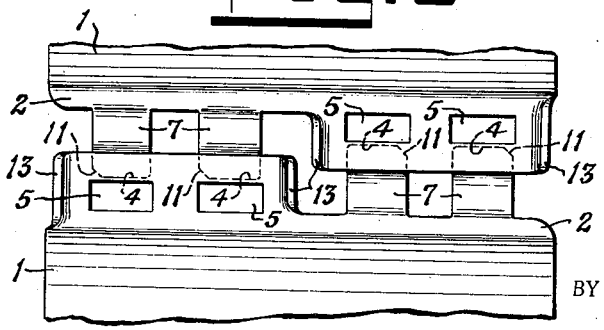
INVENTOR.
Platon Lazarides
BY
ATTORNEY.

Patented Mar. 12, 1940

2,193,426

UNITED STATES PATENT OFFICE 2,193,426

PIPE CLAMP

Platon Lazarides, New York, N. Y.

Application July 12, 1938, Serial No. 218,755

1 Claim. (Cl. 138—99)

This invention relates to devices employed for closing openings in pipes or conduits and for repairing cracked or broken pipes or conduits and commonly referred to in the related art as pipe clamps.

The main object of the invention is to provide a clamp or pipe sleeve in two identical parts or halves adapted to be coupled together about a pipe thereby avoiding the necessity of manufacturing such clamps or sleeves in pairs. In other words, two identical units comprise the clamp or sleeve, permitting the manufacture in single units, preferably by stamping from sheet metal with a single die, and thereby effecting a considerable reduction in cost of manufacture and a saving for the supply trade by avoiding the necessity of carrying a stock of paired parts. Another object of the invention is to provide a clamp or sleeve which may be more readily applied to and removed from a pipe than has been possible with clamps for this purpose as heretofore constructed. Other objects of the invention will become obvious from the detailed description in connection with the drawing.

In the accompanying drawing which illustrates the invention—

Figure 1 is a longitudinal elevation of one of the unitary members of the clamping sleeve, two of which when hooked together form the complete sleeve to be secured about a pipe with ordinary bolts.

Figure 2 is an end elevation of the member illustrated in Figure 1.

Figure 3 is a top plan view of the clamping sleeve assembled and secured on a pipe.

Figure 4 is a vertical cross-section on the line 4—4 of Figure 3, and

Figure 5 is a detail illustrating the relative position of the locking members preparatory to the interlocking movement.

Referring to the drawing, and more particularly to Figures 1 and 2, it will be seen that the unitary clamp member is formed in a single piece, stamped from sheet metal, having a curved or semi-cylindrical body section 1, and flanges 2 and 3. The flange 2 is stamped out to form tongues 4 and slots 5, and flange 3 is stamped out to form bolt-holes 6. It will be observed by reference to Figure 2 that flanges 2 and 3 are stamped to lie approximately in the same plane and that the tongues 4 have an oblique bend inward forming shoulders 7, the ends 4 having a reverse bend so as to project in a plane parallel to the section of flange 2 in which the slots 5 are punched. The width of the tongues 4 and length of slots 5 are such as to permit a free interlocking fit of the tongues within the slots of the opposite unit, and the width or height of the slots 5 is approximately twice the thickness of the metal, that is, a space such that the shoulders 7 which form oblique sections adapted to engage diametrically opposite longitudinal edges of the slots, will fit closely between the upper and lower edges of the slots when the sleeve members are hooked together as seen in Figure 4, and thus hold the two halves of the sleeve against vertical movement relative to each other. The longitudinal spacing 8 between the tongue and slot sections of flange 2 as seen in Figure 2 is approximately the thickness of the flange, that is, a space sufficient to provide a free fit for the slot section of flange 2, or female member of the lock, when the parts of the sleeve are hooked together and placed about a pipe 9 as seen in Figures 3 and 4. The bolt holes 6 in the flange 3 may be either round or square, but preferably are punched square to permit the use of bolts 10 having either round or square shanks.

In Figure 5 is shown the overlapping position of the male and female locking members of the sleeve preparatory to turning them into the interlocked position of Figures 3 and 4. From this view it will be observed that when the two units are brought together for interlocking they must be held approximately in a horizontal plane with the tongues 4 of each unit in contact with the underside of the slot sections of the locking flange. In effecting the interlocking of the units they are turned downward relatively to each other to bring the two units into the position of Figure 4, and in doing so the tongues 4 slide into the slots 5, and to facilitate the entrance of the tongues into the slots, the tongues are bevelled at the outside corners as indicated at 11 in Figure 5.

In order to prevent or reduce the possibility of the slotted section of locking flange 2 bending when pressure is applied on the web 12, Figure 1, by tongues 4 when tightening the bolts 10, a right-angled bend is imparted to the ends of the flange as indicated at 13 in Figure 3. This bending of the flange is performed when stamping the unit into shape. The two right-angled bends 13 as will be evident resist the tendency of web portions 12ª bending when pressure is applied by tongues 4 on the web section 12.

While the sleeve member is illustrated as having a pair of tongues 4 and a pair of slots 5 for a sleeve of given length, it will be understood that for shorter sleeves a single tongue and slot may be provided, or any desired number of tongues and slots may be provided according to the length of the sleeve.

What I claim is:

In a pipe clamp, a pair of similar units each comprising a semi-cylindrical body having a bolt-hole flange projecting laterally from one longitudinal edge of said body, a locking flange projecting laterally from the opposite edge of said body extending approximately one-half the length thereof, and said flange on both units having a rectangular perforation extending lengthwise thereof, and a tongue on each unit projecting laterally from the other half of said longitudinal body edge for projection through the locking flange of the other clamp unit, and said tongue having an obtuse angled bend adjacent the body section whereby when interlocked with the locking flange said bend extends obliquely through the perforation of the locking flange and the outer end of the tongue projects in a plane substantially parallel to the locking flange.

PLATON LAZARIDES.